US00RE42673E

(19) United States
(12) Reissued Patent
Mestha

(10) Patent Number: US RE42,673 E
(45) Date of Reissued Patent: Sep. 6, 2011

(54) STATE-SPACE BASED MODELING OF PIXEL ELEMENTS OF A DYNAMICALLY VARYING COLOR MARKING DEVICE

(75) Inventor: Lalit K. Mestha, Fairport, NY (US)

(73) Assignee: Xerox Corporation, Norwalk, CT (US)

(21) Appl. No.: 12/782,812

(22) Filed: May 19, 2010

Related U.S. Patent Documents

Reissue of:
(64) Patent No.: 7,375,851
Issued: May 20, 2008
Appl. No.: 10/348,263
Filed: Jan. 21, 2003

(51) Int. Cl.
*H04N 1/60* (2006.01)
*H04N 1/50* (2006.01)

(52) U.S. Cl. ..... 358/1.9; 358/3.02; 358/2.1; 358/504; 358/518; 358/532

(58) Field of Classification Search ..... 358/1.9, 358/3.02, 504, 518, 532, 3.09–3.12, 404–406
See application file for complete search history.

(56) References Cited

U.S. PATENT DOCUMENTS 5,357,448 A * 10/1994 Stanford ..... 382/112
5,708,916 A * 1/1998 Mestha ..... 399/49
6,075,614 A * 6/2000 Ohtsuka et al. ..... 358/1.1
6,157,469 A 12/2000 Mestha
6,236,474 B1 5/2001 Mestha et al.
6,278,533 B1 * 8/2001 Takemoto ..... 358/521
6,744,531 B1 6/2004 Mestha
6,809,837 B1 10/2004 Mestha
6,934,053 B1 8/2005 Mestha
2003/0081214 A1 5/2003 Mestha

FOREIGN PATENT DOCUMENTS

EP 0 625 847 A 11/1994
EP 0 750 419 A2 2/1996
EP 0 750 419 A3 2/1996
EP 0 750 419 A2 12/1996
EP 750419 A3 * 7/1997

OTHER PUBLICATIONS

N. Roche, European Search Report for EP 04 00 1263, 3pages, completed Dec. 8, 2005, mailed Dec. 19, 2005, Berlin.

* cited by examiner

*Primary Examiner* — David K Moore
*Assistant Examiner* — Quang N Vo
(74) *Attorney, Agent, or Firm* — Fay Sharpe LLP

(57) ABSTRACT

The color management system comprises a state-space based model for a pixel element in a dynamically varying color marking device. A sensor measures the color of the printed output for construction of a selected set of sensitivity functions representative of color output relating to inputs. The gradients of the sensitivity functions are extracted and used to develop the corresponding discrete multivariable state-space model of the pixel element. More particularly, the model is constructed from the Jacobian matrix characterizing a change in measured color output for a change in input color values of the pixel. Extension of modeling methodology for a single pixel is applied to multiple pixel elements.

10 Claims, 5 Drawing Sheets

STATE-SPACE BASED MODELING OF PIXEL ELEMENTS OF A DYNAMICALLY VARYING COLOR MARKING DEVICE

Matter enclosed in heavy brackets [ ] appears in the original patent but forms no part of this reissue specification; matter printed in italics indicates the additions made by reissue.

FIELD OF THE INVENTION

The subject invention pertains to the art of color management and image/text printing or display systems, and is especially applicable to a method and apparatus wherein a state-space based model of the pixel elements dynamically represents a device operation. A sensor monitors a color print output or construction of a selected set of sensitivity functions representative of color output relating to inputs. The gradients of the sensitivity functions for the pixel elements are extracted and used to develop the discrete model. Such a model enables developing a control system that provides reduced error between requested and printed colors of the ensemble of image pixels printed in color marking systems over conventional tone reproduction curve modeling.

Color correction and/or control should not be confused with color registration systems and sensors for insuring that colors are positioned properly, printed accurately, superposed correctly and/or adjacent to one another.

BACKGROUND OF THE INVENTION

In today's business and scientific world, color has become essential as a component of communication. Color facilitates the sharing of knowledge and ideas. Companies involved in the development of digital color print engines are continuously looking for ways to improve the total image quality of their products. One of the elements that affects image quality is the ability to consistently produce the same quality image output on a printer from one day to another, from one week to the next, month after month. Users have become accustomed to printers and copiers that produce high quality color and gray-scaled output. Users now expect to be able to reproduce a color image with consistent quality on any compatible marking device, including another device within an organization, a device at home or a device used anywhere else in the world. There has been a long felt commercial need for efficiently maintaining print color predictability, particularly as electronic marketing has placed more importance on the accurate representation of merchandise in illustrative print or display media.

Description of color, color perception and psychological and physiological phenomena involving light, object and observer, including color measurements using spectrophotometers are described in R. W. G. Hunt, "The Reproduction of Color in Photography, Printing and Television". Fourth Edition, Fountain Press, Tolworth, England 1987 ISBN 0-8524-2356.

The functional models presented in this specification use a device independent color space to consistently track a set of target colors. L*, a*, b* are the CIE (Commission Internationale de L'eclairage) color standards utilized in the modeling. L* defines lightness, a* corresponds to the red/green value and b* denotes the amount of yellow/blue, which corresponds to the way people perceive color. A neutral color is a color where a*=b*=0.

Over time, the output of conventional marking devices drift (or deviate from predetermined optimum standards) due to various factors. These factors include environmental conditions (temperature, relative humidity, etc.), the type of media (e.g., different paper types and paper batches, transparencies, etc.) used, variations in media, variations from original models used in initialization, general wear, etc. When a marking device is originally initialized, and at regular or irregular intervals thereafter, it is calibrated and characterized to produce output as close as possible to a reference standard. The full calibration and characterization process, however, is time consuming and expensive, particularly because specific expertise is required.

As an example, calibration and characterization of a conventional four-color CMYK (cyan, magenta, yellow and black) printer or copier involves at least the following processes: (1) generating a 3D look-up table (LUT) for mapping device independent parameter space to CMY (cyan-magenta-yellow) space; (2) executing a GCR (gray component replacement)/UCR (under color removal) strategy to convert the CMY space parameters to CMYK space parameters which represent the colors of a typical four-color marking device; (3) constructing marking device TRCs (tone reproduction curves) to account for marking device variabilities (normally done at the time of manufacturing or whenever the printer calibration and characterization process is involved); and (4) applying a suitable half-toning strategy to convert the CMYK continuous tone description obtained after using the 3D LUTs in steps 1 and 2 above and 1 D LUTs in step 3 above, to the image. The first two steps are generally grouped under printer characterization. The third step is normally called calibration for the purpose of the subject invention. The hardware/software package for implementing these processes in a marking device is typically identified as the "digital front end" (DFE).

In processing the image, the critical step that accounts for variations in marking device output is TRC construction. TRCs are stored plots of an input parameter value versus an output parameter value for a particular color. A TRC is a monotonically increasing marking device function in input-output contone space or input-output density space or input-output byte space, or combinations thereof. In other words, a TRC indicates the value of the output parameter for a specific device that must be used to reproduce the input parameter (if the input and output parameters are exactly equal, then the inputs and outputs are expressed in the same coordinate space). Inaccuracies in the TRC construction step can lead to inaccuracies in color balancing and the 3D LUT. In modern printing systems such functional modeling can contain complex control and calibration loops. These loops measure the state of the image on the photoreceptor by measuring the charge and the developed mass and actuate the charging and development system parameters to maintain the developability to some target setpoints. Other level loops, on the other hand, are designed to produce the TRCs for each separation by measuring the developed toner mass on the photoreceptor belt. These process loops can maintain the developability of each separation to some target set points. However, a particular problem exists in that controlling developed mass on the belt alone will not give consistent color on the media because of variabilities in the transfer and media. Gray balanced calibration and profiling loops are expected to minimize the inconsistency on a single as well as multiple media. The gray balanced loops use the spectrophotometric measurements of the patches near neutral and produce one-dimensional TRCs as correction LUTs for the image. The profiling loops also use the spectrophotometric measurements, but are designed to produce a complex four-to-four or three-to-four multidimensional LUTs. Designing these colorimetric/photometric correction loops require accurate models. Phenomenological, Neugerbour models are currently used extensively in building one and multidimensional LUTs. Data on an exemplary printer shows that the Neugerbour models have a prediction mean error of deltaE=4 and max error of deltaE=9. Many times these errors are caused by non-uniformity in the printed area on the page. This leads to measurements errors. Further refinements in TRC modeling to get improved accuracy are difficult due to the measurement errors in the model.

A full-fledged printer characterization/profiling is costly and time consuming because colors have to be measured through out the color space and therefore can involve a large number of color test patches and iterations.

The subject invention is particularly useful to provide solutions to the foregoing color problems for a wide range of color workflow practices. Improved modeling can be used for controlling customer selectable colors, spot colors and constructing gray balanced LUTs and building profiles using inline/offline spectrophotometric measurements. Printing and product enhancements are provided that would enable customers to manipulate color documents on a screen before even printing/displaying an output on different output devices in ways that improve the productivity of a current workflow by taking advantages of more consistent and accurate output colors produced by the printing devices.

The subject invention exploits a key enabling factor for these operational advantages by utilizing state-space based methods that are increasingly useful due to the corresponding complexity in nature of the printing systems. First principle/phenomenological models will not give accurate color due to the need to fit too many parameters.

BRIEF SUMMARY OF THE INVENTION

The subject invention exploits the use of a state-space based mathematical model for modeling and controlling a color marking device behavior. The model is constructed from the inverse of a matrix characterizing a change in measured color output with change in ink specification, and integrated errors between desired and measured color. The subject invention provides advantageous applications and improved efficiencies in maintaining gray balance and measuring control parameters on line.

In accordance with the present invention, a method is provided for modeling a dynamically varying color reproduction device from an output image generated in response to a target test. The method includes steps of producing an image with the device in response to an input signal from the test target wherein the test target comprises a preselected color. A sensor measures an output signal representative of the output image corresponding to the target preselected color. A state-space based model of color producing behavior is constructed and includes a matrix characterization of a gradient of change for a plurality of the measured output signals relative to a corresponding plurality of the input signals. Subsequent control of device color reproduction is made in accordance with the so determined state-space based model.

In accordance with a more limited aspect of the present invention, the state-space based model is constructed using a color sensitivity function to extract the gradient. The gradient is preferably formed as a Jacobian matrix of a plurality of the sensitivity functions. More particularly, device control is implemented by applying an inverse of the Jacobian matrix to a selected input signal in a forward path control loop to generate the corresponding output signal.

In accordance with a more limited aspect of the present invention, the sensitivity function comprises generating a sector of device input-output characteristics about a nominal set of measured L*, a*, b* values. The state-space based model assumes a linearity of the sensitivity function about the nominal set of measured L*, a*, b* values.

In accordance with another aspect of the present invention, a color marking device is provided that includes a control system for calibration of the device based upon dynamic color balance control of an output image. The system comprises a front end converter for converting an input signal representative of a target image comprising a preselected color into a device dependent control signal in accordance with a state-space based model. A colored marking device outputs an output image in response to the control signal. A sensor measures a parameter from the output image representative of a color of the output image. An open loop system controller compares the parameter with the corresponding parameter for target image and constructs a sensitivity function of output color about a selected set of nominal device color values. The sensitivity function characterizes the change in measured color output with a change in ink specification. A closed loop system controller constructs the state-space based model from a gradient of sensitivity function at the selected set of nominal device color values. Subsequently generated output images are output with the closed loop system controller and more accurately represent target input images.

The basic structure of the state-space model is linear and dynamic and has a relationship between the input CMY values to printed color values (L*, a*, b*) for a given pixel. The model has a common structure for all pixels but is unique in its values for each individual pixel. In accordance with this invention, the determination of the model is shown for a single pixel. The model represents each pixel's three states. The states correspond to the trichrometric values of the pixels, e.g., L*, a*, b* values. The input/output relationship is captured in the state-space model with the sensitivity function.

In accordance with a more limited use of the present invention, the closed loop system controller using the state-space model comprises an inverse of the Jacobian matrix which is the matrix of sensitivity elements between input and output parameters of the marking system. The closed loop system controller may comprise a look-up table including the inverse of the Jacobian matrix. One advantage obtained by using the present invention is a model for a color reproduction system which provides improved accuracy in the presence of printer drift and media uncertainties. Devices comprising the subject invention which generate an error greater than a certain predetermined value can be easily recalibrated or repaired. The model construction process is neither operator nor human assisted when the insitu color sensors are used in the printing system.

Another advantage of the subject invention is related to developing closed loop control systems to provide accurate desired color in the presence of measurement errors due to non-uniformity in the printed area of the page.

Another advantage of the subject invention is its ability to model every pixel in a dynamically varying color marking device.

Another advantage of the subject invention is that the constructive model can be used to diagnose device deviations from normal operating limits, by use of a robust and accurate dynamic, state-space description of the model.

Another advantage of the subject invention is a mathematical model using weighted integrated errors between desired and measured color that provides a stable operating region for the control system.

Other benefits and advantages for the subject new methods and system will become apparent to those skilled in the art upon a reading and understanding of this specification.

BRIEF DESCRIPTION OF THE DRAWINGS

The invention may take physical form in certain parts and steps and arrangements of parts and steps, the preferred embodiments of which will be described in detail in the specification and illustrated in the accompanying drawings, which form a part hereof and wherein.

DESCRIPTION OF THE PREFERRED EMBODIMENTS

Figure 1:
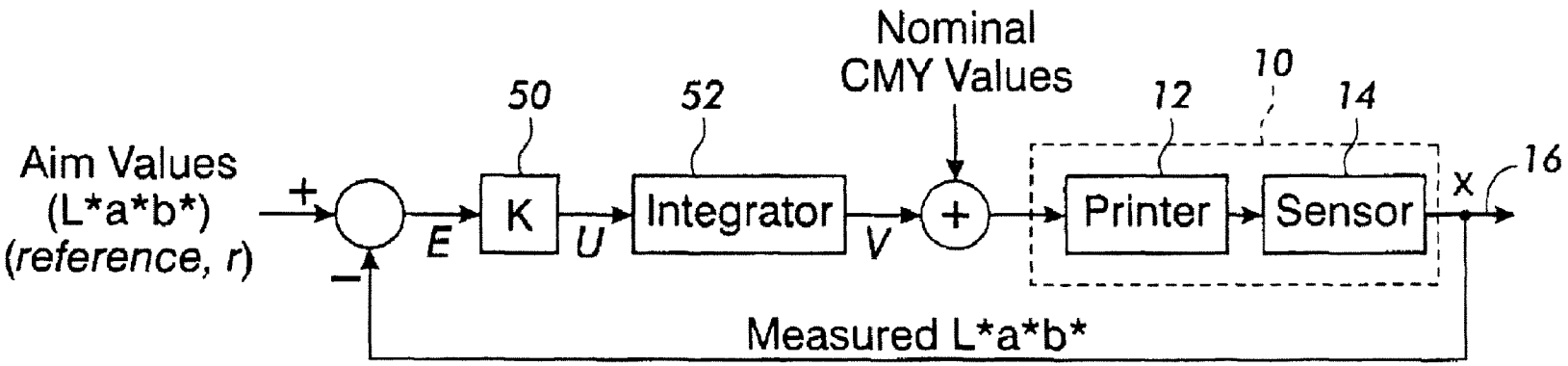
FIG. 1 PRIOR ART
FIG. 1 is a schematic/block diagram of a conventional model for a color marking device.

Referring now to the drawings wherein they are shown for purposes of illustrating the preferred embodiments of the invention only and not for purposes of limiting the same, the Figures show a method and apparatus for generating a dynamic device model automatically using an insitu color sensor. The model can be exploited as either a forward or inverse model. The invention has practical applications where a customer can use the dynamic device model by making a simple call to the device in a soft-proofing package to make aesthetic or rendering decisions on the input he/she supplies (e.g., graphics) to the printer. Without having the dynamic model of the device, customer intentions or preferences cannot be met accurately, although they can be conceived visually on a monitor. This type of model is especially beneficial when trying to accurately reproduce color in a predictable manner.

FIG. 1 depicts a block diagram representation of a conventional system model for a pixel element illustrating how to build a stable control loop for that pixel with a minimal number of iterations to construct good gray balanced TRC's using the methods discussed in the Background above. The plant 10 specified in this system diagram consists of an ink marking device 12 and a color-sensing device 14, although the invention is not restricted to ink marking devices alone and any image reproducing/displaying system such as printers, monitors or other imaging devices are intentionally included. In this application, the color-sensing device 14 is a spectrophotometer. The spectrophotometer provides the plant output "x" 16 after capturing spectral information on the colors detected. The spectral information is a signal representative of the printed colors of the image and preferably comprises L*a*b* values, XYZ, Luv, etc., values depending on the desired color descriptions. For this description, only L*a*b* coordinate space values are used for describing color.

Figure 2A:
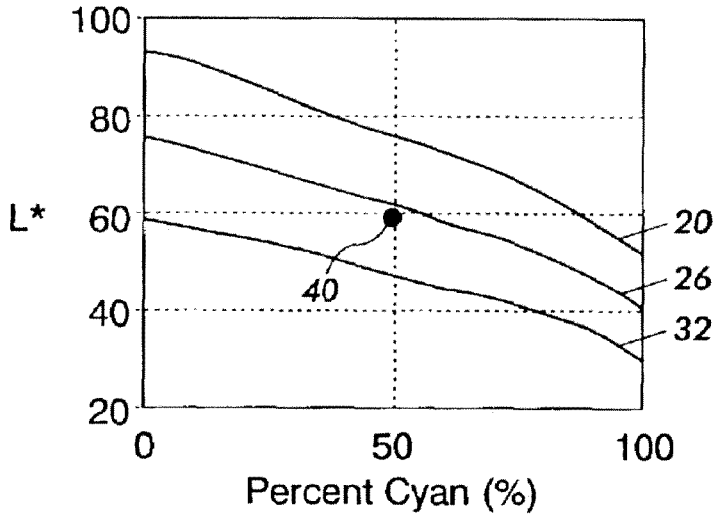
FIGS. 2a-2d are graphical representations of operational sensitivity functions for the marking device.
Figure 2B:
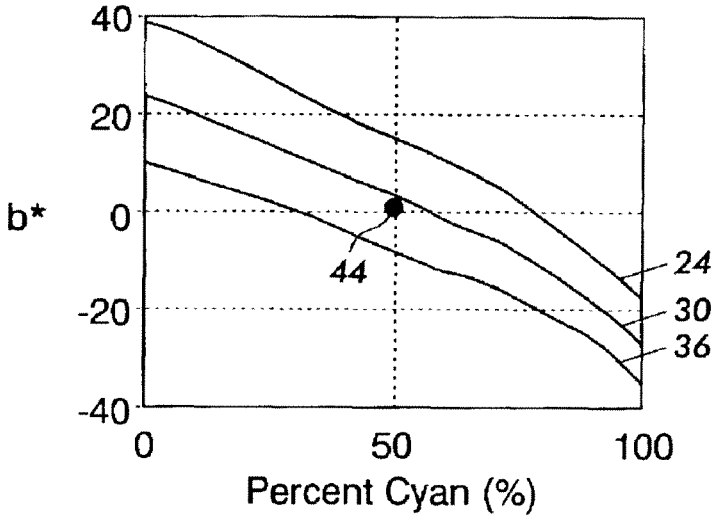
Figure 2C:
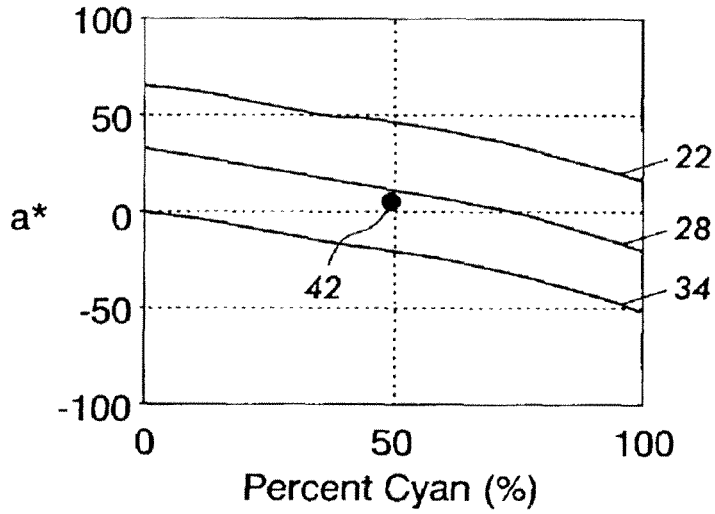
Figure 2D:
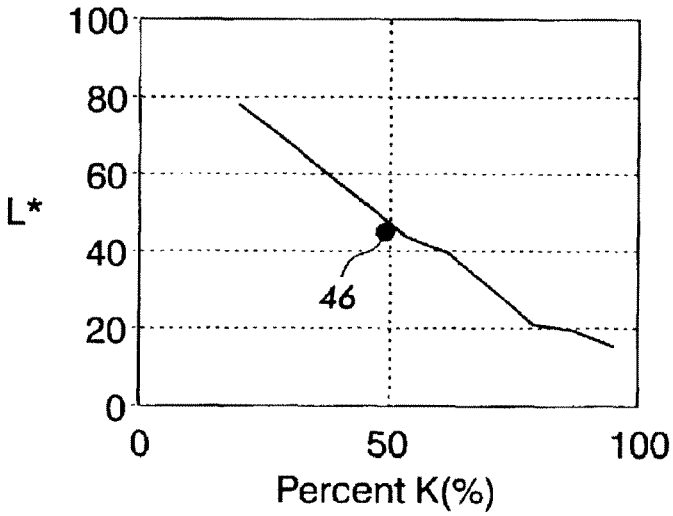
Figure 3:
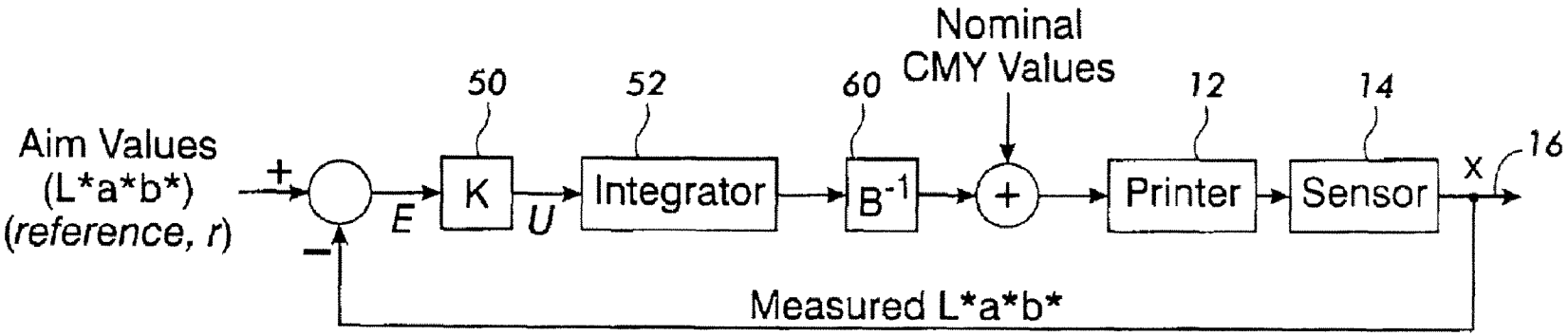
FIG. 3 is a schematic/block diagram of a state-space based model for the color marking device in accordance with the present invention.

At the nominal values (e.g., C=50%, M=50%, Y=50%) the printer input-output characteristic or "sensitivity functions" can be represented as in FIGS. 2a-2d, Measured L*, a*, b* values are shown by the vector x in FIG. 3. The FIGS. 2a-2d show a representative of L*, a*, b* values when C is varying at constant M and Y. Curves 20, 22, 24 show varying C when M=10% and Y=50%, curves 26, 28, 30 represent the curves for varying C with nominal MY values at 50%, and curves 32, 34, 36 represent varying C when M=90% and Y=50%. FIG. 2d shows varying K when C=M=Y=0%. The nominal points identified by blocks 40, 42, 44 are at C=M=Y=50% and in FIG. 2d at block 46 where K=50%, and C=M=Y=0%.

Image path in a tour color CMYK printed system contains a GCR/UCR processing black for removing a K component from the CMY values of the pixel to provide a means to add a separate K input externally. For such systems FIG. 2d is used to represent a K separation system as a single input, single output dynamic state-space model.

By assuming the system to be linear at the nominal CMY values 40, 42, 44 the system 10 can be approximated by the following discrete equation. If k is the iteration number, then the open loop system equation can be written in terms of the Jacobian—the first derivative between output and the input, which is given by:

$$\chi(k+1)=BV(k)+\chi_o \tag{1}$$

Where, $$\chi=\begin{bmatrix} L^* \\ a^* \\ b^* \end{bmatrix},\ V=\begin{bmatrix} \partial C \\ \partial M \\ \partial Y \end{bmatrix},\ B=\begin{bmatrix} \frac{\partial L^*}{\partial C} & \frac{\partial L^*}{\partial M} & \frac{\partial L^*}{\partial Y} \\ \frac{\partial a^*}{\partial C} & \frac{\partial a^*}{\partial M} & \frac{\partial a^*}{\partial Y} \\ \frac{\partial b^*}{\partial C} & \frac{\partial b^*}{\partial M} & \frac{\partial b^*}{\partial Y} \end{bmatrix}$$

$$\chi_o=\begin{bmatrix} L^* \\ a^* \\ b^* \end{bmatrix}$$

values for nominal CMY.

V then represents a vector containing small deviations in C, M, Y values from the nominal C, M, Y values. B is a vector representing the gradient of change from the output signals x relative to the input signals about the selected nominal values from the determined sensitivity functions of FIGS. 2a-2d. Signal $\chi$ represents the state variable vector of the pixel element for the open loop system 10. $\chi_0$ is the initial value of the state variable vector. Vector V is the actuator of the open loop system used for varying the state vector $\chi$.

If the control loop is closed for the system 10 with a multivariable gain k 50 and an integrator 52 (FIG. 1), then the closed loop state-space model can be derived as follows:

$$V(k)=V(k-1)+u(k) \tag{2}$$

Input to the integrator is given by u(k)=KE(k).

In Equation (2), K is the gain matrix, and E is the error vector between measured L*, a*, b* values and the aim values. If the B matrix is invertible, then using the open loop system equation, the following closed loop state-space model can be obtained, $$\chi(k+1)=A\chi(k)+Bu(k);\ u(k)=KE(k) \tag{3}$$

In Equation 3 above, the A matrix is given by: A=diag [1 1 1], and u is the actuator vector.

For this type of formulation, the actuator vector u in Equation (3) is different from the actuator vector V used in Equation (1). From Equation (2), the actuator vector u is related to the actuator vector V. Equation (1) is the open loop state-space model and Equation (3) is the closed loop state-space model.

If control of multiple pixel elements is required, which is generally the case in most of the printer control problems, then $\chi$ and u vectors can be augmented with corresponding state and actuator values of other pixel elements. The gain matrix K is also augmented. The augmented gain matrix K, used for controlling all pixels, becomes block diagonal.

An application of the state-space based model in the manner of the subject invention used for controlling one pixel element can now be seen with reference to FIG. 3. For constructing a gray balanced algorithm the state-space based model can be used to design the gain matrix K. A look-up table containing an inverse 60 of the B matrix is included in the forward path of the feedback controller of FIG. 3. The use of the B matrix inside the algorithm is a direct result of the state-space based model. The approach is called system linearization. The closed loop system model for the augmented system with the inverse (B) LUT is given by:

$$\chi(k+1)=\chi(k)+ME(k) \tag{4}$$

Equation (4) is now in single input, single output form with M containing these gains between 0 and 1 arranged diagonally for a given pixel element; one gain for each L*, a* and b* value. If such linear representation is combined for other pixel elements, then the matrix M is augmented in the manner described above. The augmented M matrix in Equation (4) is in diagonal form with the gains between 0 and 1. These gains are now fixed between 0 to 1 and can be set to give closed loop performance set by the following transfer function. The transfer function shown below is obtained by taking z-transforms of Equation (4).

$$\chi(z)/R(z)=[z1-(1-k)]^{-1}M \tag{5}$$

R(z) contains the z-transform of the aim values, [z1−(1−M)] is the characteristic equation containing poles of the closed loop system for controlling L*, a* and b* values. Control for lightness can be set different from a* and b*; all by designing M between 0 and 1. If one wants to emphasize good control of chroma (i.e., a* and b*) then lightness can be relaxed, thus leading to the choice of desired preference.

Thus, the modeling methods disclosed herein are intended to be applicable for color modeling and calibration for all the individual pixel elements of the marking device, or for likewise modeling of a plurality of elements such as a macro pixel comprising a plurality of some color pixels.

Figure 4:
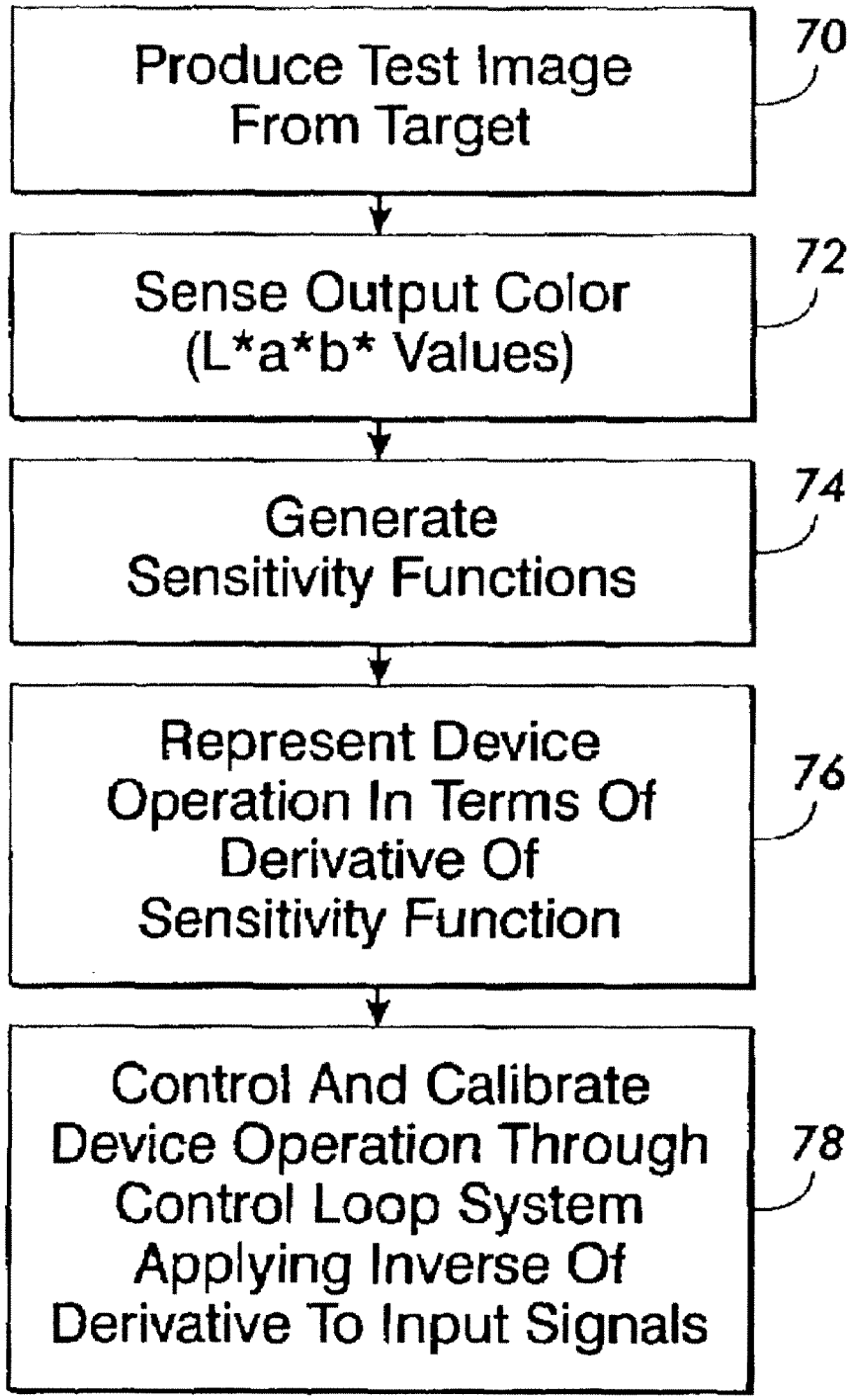
FIG. 4 is a flowchart detailing the processing steps for the subject model construction and implementation in a marking device.

Referencing FIG. 4, the flowchart representative of the preferred steps for implementation of the subject invention is illustrated. First, a test image is produced 70 from a target, such as the nominal C, M, Y values shown in FIG. 1. The output is sensed 72 with sensor 14 to generate output color values such as the measured L*, a*, b* values. Sensitivity functions are generated 74 so that device operation can be represented 76 in terms of a derivative of the sensitivity function. The derivative is the B matrix of Equation 3. After the closed loop system model is constructed such as is seen in FIG. 3 and Equation 3, the device can be controlled and calibrated 78 through the closed control loop system comprising the application of the inverse of the derivative of the sensitivity functions to the input signals.

The invention has been described with reference to the preferred embodiment. Obviously, modifications and alterations will occur to others upon a reading and understanding of the specification. It is our intention to include all such modifications and alterations insofar as they come within the scope of the appended claims or the equivalents thereof.

I claim:

1. A method for modeling [the] pixel elements of a dynamically varying color reproduction device from output image pixels generated in response to a test target, including steps of:

producing an *output* image with the device in response to an input signal from the test target wherein the test target comprises a plurality of pixels;

measuring with a sensor an output signal representative of the output image corresponding to a target preselected color; and constructing a linear state-space model of color producing behavior [for a single pixel] including a matrix characterization of the color reproduction device, wherein *the matrix characterization represents* a gradient of [change of] a *plurality of* color sensitivity function [is]*s* represented as a Jacobian matrix*, the gradient is* with respect to the input signal for the measured output signal at a nominal set of measured *output* values*,* and the gradient is predetermined as linear about the nominal values, wherein the state-space model represents the color reproduction device operation in terms of a derivative function between device input and output as:

$$[y(k+1)]\,x(k+1)=BV[(K)](k)+X_0$$

where k is an iteration number, $X_0$ are L*, a*, b* values for a nominal CMY values, and, $$\chi=\begin{bmatrix}L^*\\a^*\\b^*\end{bmatrix},\ V=\begin{bmatrix}\partial C\\\partial M\\\partial Y\end{bmatrix},\ B=\begin{bmatrix}\frac{\partial L^*}{\partial C} & \frac{\partial L^*}{\partial M} & \frac{\partial L^*}{\partial Y}\\ \frac{\partial a^*}{\partial C} & \frac{\partial a^*}{\partial M} & \frac{\partial a^*}{\partial Y}\\ \frac{\partial b^*}{\partial C} & \frac{\partial b^*}{\partial M} & \frac{\partial b^*}{\partial Y}\end{bmatrix}\chi_o=\begin{bmatrix}L^*\\a^*\\b^*\end{bmatrix}.$$

values for nominal CMY.

[2. The method as defined in claim 1 wherein the constructing includes forming a Jacobian matrix of a plurality of the sensitivity functions.]

3. The method of claim 1 further including controlling device color reproduction in accordance with the state-space model.

4. The method as defined in claim 3 wherein the controlling comprises applying an inverse of the Jacobian matrix to a selected input signal for generating a corresponding output signal.

5. The method as defined in claim 4 wherein the generating the corresponding output signal comprises processing the selected input signal with a look-up table including the inverse of the Jacobian matrix in a forward path of a system controller.

6. The method as defined in claim 1 wherein the [using the] color sensitivity function comprise[s generating] a sector of device input-output characteristics about the nominal set of measured L*, a*, b* values.

7. The method as defined in claim 1 wherein the constructing is for a single pixel or a macro pixel comprising a plurality of single pixels of the same color.

8. A color marking device including a control system for calibration of the device based upon dynamic color balance control of an output image, the system comprising:

a front end converter for converting an input signal representative of a target image comprising a preselected color into a device-dependent control signal in accordance with a linear state-space model;

a color marking device for outputting an output image in response to the control signal;

a sensor for measuring a parameter from the output image representative of a color of the output image;

an open loop system for comparing the parameter with a corresponding parameter from the target image and constructing a sensitivity function of output color about a selected set of nominal device color *input* values; and, a closed loop system controller for constructing the linear state-space model from a gradient of the sensitivity function at the selected set of nominal device *input* color values, at a nominal set of *respective* measured *output* values wherein the gradient is predetermined as linear about the nominal values, whereby subsequently generated output images are output with the closed loop system controller and more accurately represent target input images, and the open loop system comprises a representation of the state-space model of color marking device operation between device input and output as:

$$X(k+1)=BV[(K)](k)+X_o$$

where k is an iteration number, $X_o$ are L*, a*, b* values for a nominal CMY values, and, $$\chi = \begin{bmatrix} L^* \\ a^* \\ b^* \end{bmatrix}, V = \begin{bmatrix} \partial C \\ \partial M \\ \partial Y \end{bmatrix}, B = \begin{bmatrix} \frac{\partial L^*}{\partial C} & \frac{\partial L^*}{\partial M} & \frac{\partial L^*}{\partial Y} \\ \frac{\partial a^*}{\partial C} & \frac{\partial a^*}{\partial M} & \frac{\partial a^*}{\partial Y} \\ \frac{\partial b^*}{\partial C} & \frac{\partial b^*}{\partial M} & \frac{\partial b^*}{\partial Y} \end{bmatrix}$$

$$\chi_o = \begin{bmatrix} L^* \\ a^* \\ b^* \end{bmatrix}$$

values for nominal CMY.

9. The system as defined in claim 8 wherein the closed loop system controller comprises an inverse of a Jacobian matrix including the gradient of the sensitivity function.

10. The system as defined in claim 9 wherein the closed loop system controller comprises a look-up table including the inverse of the Jacobian matrix in a forward path for the loop.

11. The color marking device of claim 8 wherein the state-space model of a pixel element comprises a representation of device operations between input and output as:

$$X(k+1)=Ax(k)+Bu(k);\ u(k)=KE(k)$$

where k is an iteration number, u(k)=KE(k), A is an originating matrix representative of the input signal, K is the gain matrix, E is [the] *an* error vector between measured L*, a*, [B] *b** color values and desired color values, and $$\chi = \begin{bmatrix} L^* \\ a^* \\ b^* \end{bmatrix} B = \begin{bmatrix} \frac{\partial L^*}{\partial C} & \frac{\partial L^*}{\partial M} & \frac{\partial L^*}{\partial Y} \\ \frac{\partial a^*}{\partial C} & \frac{\partial a^*}{\partial M} & \frac{\partial a^*}{\partial Y} \\ \frac{\partial b^*}{\partial C} & \frac{\partial b^*}{\partial M} & \frac{\partial b^*}{\partial Y} \end{bmatrix}.$$

* * * * *